US008087000B2

(12) United States Patent
Cartledge et al.

(10) Patent No.: US 8,087,000 B2
(45) Date of Patent: Dec. 27, 2011

(54) SYNCHRONIZING CODES FROM MULTIPLE SOFTWARE CONFIGURATION MANAGEMENT SYSTEMS

(75) Inventors: Shane W. Cartledge, Markham (CA); Jung W. Van, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 1239 days.

(21) Appl. No.: 11/758,222

(22) Filed: Jun. 5, 2007

(65) Prior Publication Data
US 2008/0307393 A1    Dec. 11, 2008

(51) Int. Cl.
*G06F 9/44*    (2006.01)
(52) U.S. Cl. ......................................... 717/121; 717/122
(58) Field of Classification Search .................. 717/121, 717/122
See application file for complete search history.

(56) References Cited

U.S. PATENT DOCUMENTS

| | | | |
|---|---|---|---|
| 5,574,898 A * | 11/1996 | Leblang et al. ...................... 1/1 |
| 5,649,200 A * | 7/1997 | Leblang et al. ............... 717/122 |
| 6,507,948 B1 * | 1/2003 | Curtis et al. ................... 717/174 |
| 6,523,027 B1 * | 2/2003 | Underwood .......................... 1/1 |
| 6,601,233 B1 * | 7/2003 | Underwood .................. 717/102 |
| 6,609,128 B1 * | 8/2003 | Underwood .................. 707/610 |
| 6,633,878 B1 * | 10/2003 | Underwood .......................... 1/1 |
| 6,681,382 B1 * | 1/2004 | Kakumani et al. ............. 717/122 |
| 6,704,873 B1 * | 3/2004 | Underwood ..................... 726/12 |
| 6,792,454 B2 * | 9/2004 | Nakano et al. ................. 709/219 |
| 7,222,138 B2 * | 5/2007 | Fomenko ............................. 1/1 |
| 7,228,319 B1 * | 6/2007 | Fuchs .................................. 1/1 |
| 7,299,450 B2 * | 11/2007 | Livshits et al. ................ 717/121 |
| 7,644,392 B2 * | 1/2010 | Geipel et al. ................... 717/121 |
| 2003/0046441 A1 * | 3/2003 | Rau et al. ........................ 709/315 |
| 2003/0051230 A1 * | 3/2003 | Molchanov et al. ........... 717/120 |
| 2004/0003383 A1 | 1/2004 | Chenier |
| 2004/0205716 A1 * | 10/2004 | Abdel-Rahman et al. ..... 717/120 |
| 2004/0260974 A1 * | 12/2004 | Livshits .......................... 714/19 |
| 2005/0235275 A1 | 10/2005 | Betts et al. |

OTHER PUBLICATIONS

Dahlqvist, "Product Data Management and Software Configuration Management Integration", 2005.*
Saini et al., "Successful Software Configuration Management: An Essential for Software Product", 2007.*
Pham et al., "Synchronization using SyncML", 2005.*

* cited by examiner

*Primary Examiner* — Wei Zhen
*Assistant Examiner* — Phillip Nguyen
(74) *Attorney, Agent, or Firm* — Daniel McLoughlin; Hoffman Warnick LLC

(57) ABSTRACT

The invention is directed to synchronizing code from multiple Software Configuration Management (SCM) systems. A method according to an embodiment of the invention includes: obtaining source code from a foreign SCM system and a central SCM system; obtaining a list of files and directories from the foreign SCM system and the central SCM system; creating a batch file; iteratively verifying from the list of files and directories from the foreign SCM system source code whether each file is one of: a new directory, an existing directory, a new file, or an existing file; for each new file and new directory verified from the foreign SCM system, creating in the batch file a command to add the new directory or the new file to the central SCM system; and completing the batch file. Another embodiment includes merging files in the central SCM system.

5 Claims, 4 Drawing Sheets

SYNCHRONIZING CODES FROM MULTIPLE SOFTWARE CONFIGURATION MANAGEMENT SYSTEMS

BACKGROUND OF THE INVENTION

1. Field of the Invention

Aspects of the present invention generally relate to software configuration management (SCM) systems. More specifically, an embodiment of the present invention is directed to synchronizing codes from multiple SCM systems.

2. Related Art

Multiple site development organizations often face the difficult issue of integrating or synchronizing source code from different SCM systems (e.g., ClearCase, CVS, SourceSafe, etc.) into a centralized code. ClearCase is a trademark of International Business Machines Corporation in the United States, other countries, or both. SourceSafe is a trademark of Microsoft Corporation in the United States, other countries, or both. A myriad of reasons create this difficulty, including software/IT departments merge as corporate mergers and acquisitions take place, wherein software source code needs to be integrated into a single SCM system. Often smaller development teams are spread across a multi-global site, wherein each development team makes use of its own SCM systems. As the software grows, there is a need to merge code from the different SCM systems into one SCM system. Also exacerbating the development of software is the incompatibility of newer versions with older versions of SCM systems. The use of migration paths from older versions of SCM systems to newer versions can be risky and takes too long to perform during the development cycle.

Most SCM systems are required to check in the entire development code to support concurrent development activities. Hence, if the source code exists in foreign SCM systems, it is quite difficult to maintain concurrent development. Accordingly, there is a need to solve this problem by seamlessly synchronizing, integrating, and/or merging code from foreign SCM systems into the central SCM system so as to support concurrent development in multi-SCM system environments.

SUMMARY OF THE INVENTION

Aspects of the present invention are directed to synchronizing codes from multiple Software Configuration Management (SCM) systems.

A first aspect of the present invention is directed to a method for synchronizing code from a plurality of Software Configuration Management (SCM) systems, comprising: obtaining source code from a foreign SCM system and a central SCM system; obtaining a list of files and directories from the foreign SCM system and the central SCM system; creating a batch file; iteratively verifying from the list of files and directories from the foreign SCM system whether each file is one of: a new directory, an existing directory, a new file, or an existing file; for each new file and new directory verified from the foreign SCM system, creating in the batch file a command to add the new directory or the new file to the central SCM system; and completing the batch file. Another embodiment includes merging files in the central SCM system.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
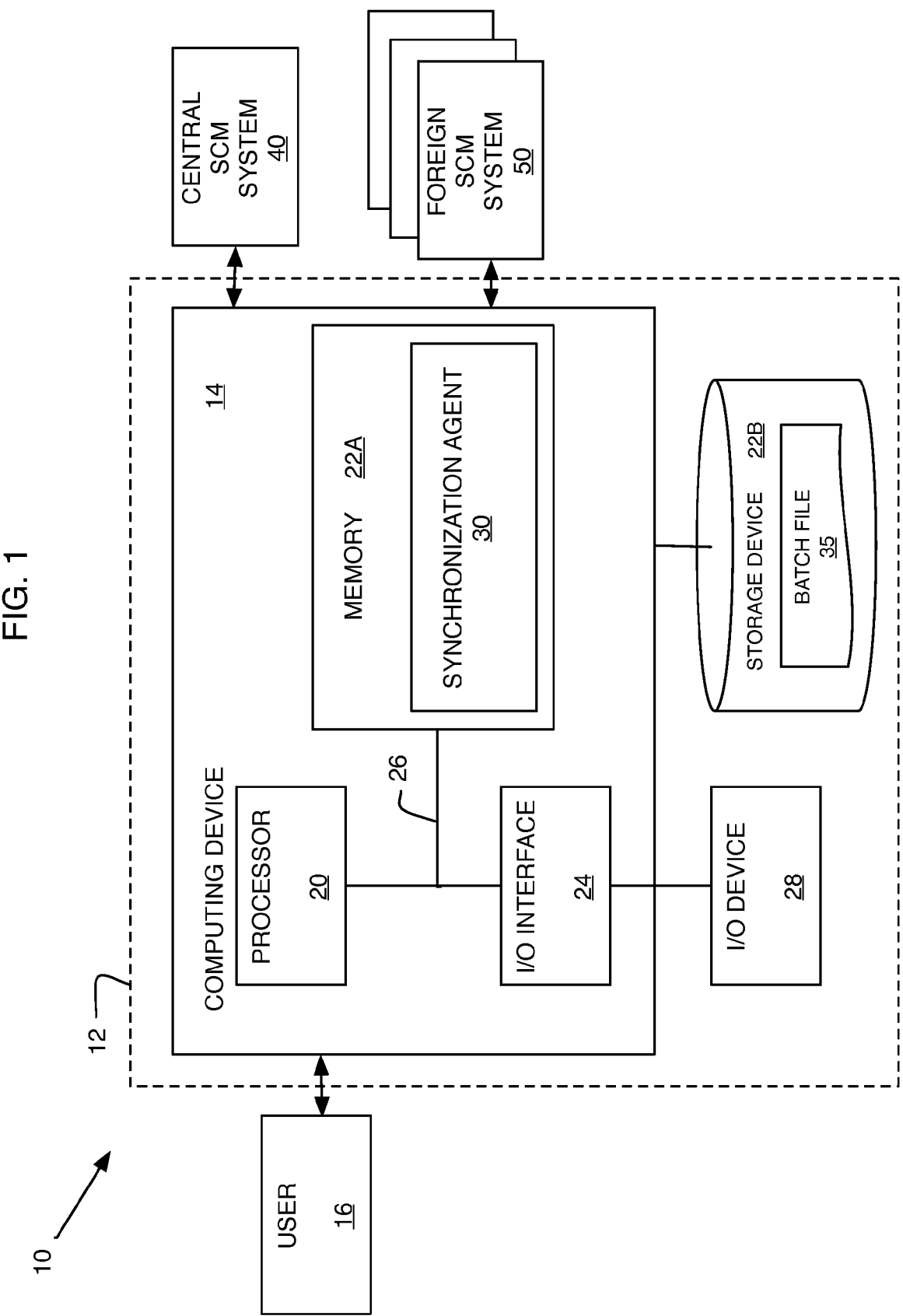
FIG. 1 shows an illustrative environment for employing a method for synchronizing code from multiple Software Configuration Management (SCM) systems according to an embodiment.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the invention provide an improved solution for synchronizing code from multiple Software Configuration Management (SCM) systems. A method according to an embodiment of the invention includes: obtaining source code from a foreign SCM system and a central SCM system; obtaining a list of files and directories from the foreign SCM system and the central SCM system; creating a batch file; iteratively verifying from the list of files and directories from the foreign SCM system whether each file is one of: a new directory, an existing directory, a new file, or an existing file; for each new file and new directory verified from the foreign SCM system, creating in the batch file a command to add the new directory or the new file to the central SCM system; and completing the batch file. Another embodiment includes merging files in the central SCM system.

Turning to the drawings, FIG. 1 shows an illustrative environment 10 for employing a method for synchronizing code from multiple SCM systems according to an embodiment of the invention. To this extent, environment 10 includes a computer system 12 that can perform the process described herein in order to allow synchronizing code from multiple SCM systems. In particular, computer system 12 is shown including a computing device 14 that comprises a synchronization agent 30, which makes computing device 14 operable for synchronizing code from multiple SCM systems 40, 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as synchronization agent 30, which is stored in a storage system, such as memory 22A and/or storage device 22B. While executing program code, processor 20 can read and/or write data, such as batch file 35, etc. to/from memory 22A, storage device 22B, and/or I/O interface 24. Bus 26 provides a communications link between each of the components in computing device 14. I/O device 28 can comprise any device that transfers information between a user 16 and computing device 14 and/or other elements (e.g., central SCM system 40, foreign SCM system(s) 50, etc.) and computing device 14. To this extent, I/O device 28 can comprise a user I/O device to enable an individual user 16 to interact with computing device 14 and/or a communications device to enable an element, such as a central SCM system 40 and/or foreign SCM system(s) 50, to communicate with computing device 14 using any type of communications link.

In any event, computing device 14 can comprise any general purpose computing article of manufacture capable of executing program code installed thereon. However, it is understood that computing device 14 and synchronization agent 30 are only representative of various possible equivalent computing devices that may perform the process described herein. To this extent, in other embodiments, the functionality provided by computing device 14 and synchronization agent 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, synchronization agent 30 enables computer system 12 to synchronize code from multiple SCM systems 40, 50. It is understood that some of the functionality may not be implemented, or additional functionality may be included as part of computer system 12.

Figure 2:
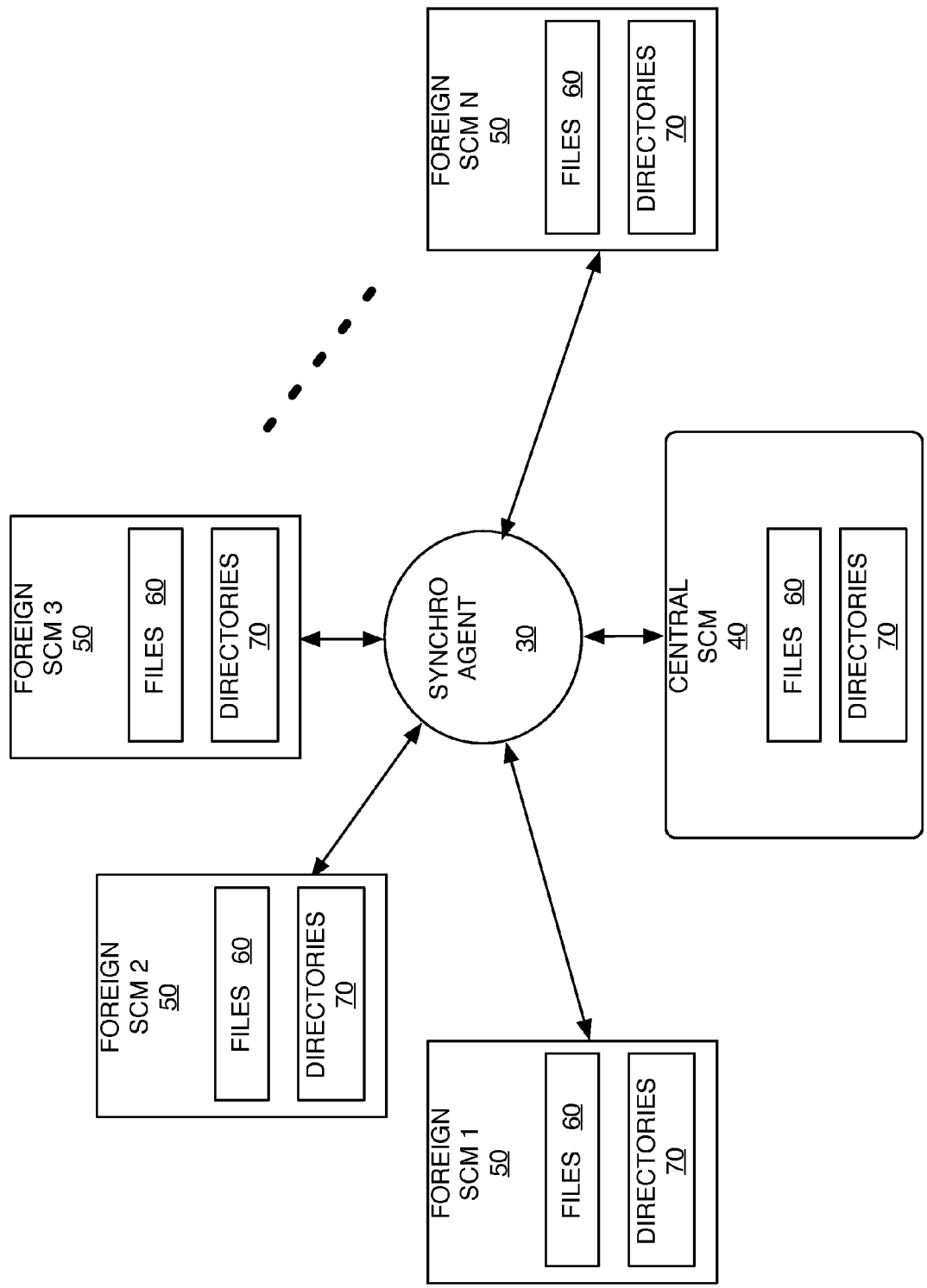
FIG. 2 shows a schematic diagram wherein the environment shown in FIG. 1 may be employed according to an embodiment.
Figure 3A:
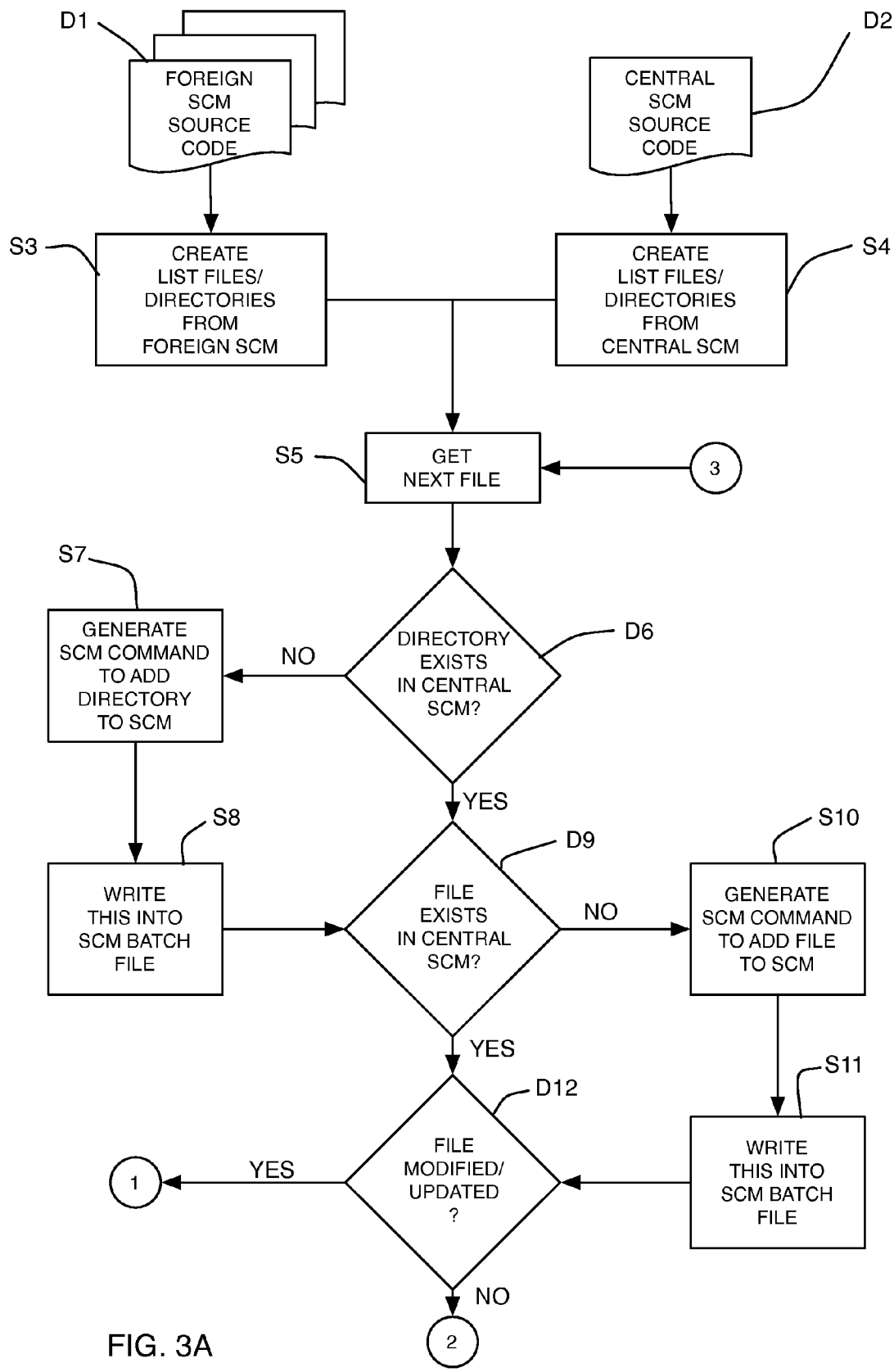
FIGS. 3A-3B show an illustrative data flow for synchronizing code from multiple SCM systems according to an embodiment.
Figure 3B:
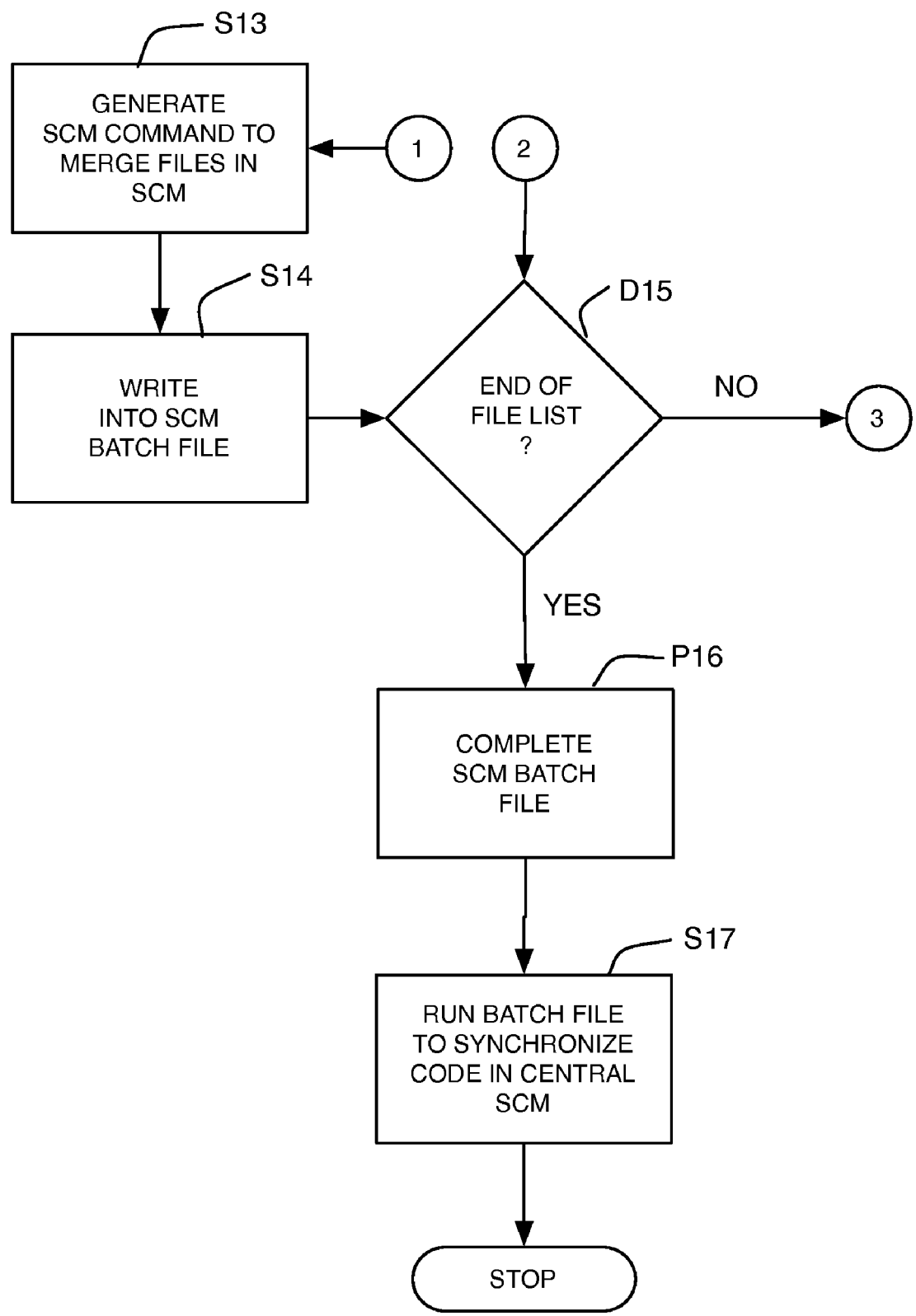

Aspects of the invention provide an improved solution for synchronizing code from multiple SCM systems 40, 50. To this extent, FIG. 2, shows a schematic view for employing computing system 12 of FIG. 1, and FIGS. 3A and 3B show an illustrative data flow or method for using the synchronization agent 30 (FIG. 1), respectively, according to embodiments of the invention. For example, a user (e.g., administrator, customer, corporation, company, service provider, software administrator, programmer, organization, entity, etc.) 16 may need to synchronize code from a plurality of SCM systems 40, 50 for any purpose and/or for whatever reason.

As an embodiment shown in FIGS. 2 and 3A-3B indicates a method wherein a plurality of foreign SCM systems 50 and at least one central SCM system 40 are in communication with a synchronizing agent 30. The foreign SCM systems 50 and the central SCM system 40 each comprise source code comprised of files 60 and directories 70. FIG. 2 depicts, for illustrative purposes only, four (4) foreign SCM systems 50, namely "Foreign SCM 1"; "Foreign SCM 2"; "Foreign SCM 3"; and, "Foreign SCM N" in communication with a single Central SCM system 40. The central SCM system 40 and foreign SCM systems 50 may, for example, comprise Source Control Management systems.

An embodiment of the method starts with the synchronizing agent 30, at D1 and D2, obtaining source code (e.g., files 60, directories 70, etc.) from both the central SCM system 40 and the foreign SCM system(s) 50. A list of files 60 and directories 70 is created (e.g., obtained either dynamically or statically) from the source code of the foreign SCM system(s) 50 and the central SCM system 40, at S3 and S4 respectively.

An empty batch file 35 (or executable file) (FIG. 1) is created that, once filled and run, will allow the synchronizing agent 30 to synchronize code amongst the SCM systems 40, 50. The batch file 35 will contain SCM commands needed to synchronize code into the central SCM system 40 with the source from the foreign SCM systems 50.

Next, a 'loop' is effectively made between the activities starting at S5 through D15, to iteratively, or recursively, go through the entire list of files 60 and directories 70 of all the SCM systems (e.g., foreign SCM system(s) 50, central SCM system 40) so as to obtain a plurality of information. At D6, it is determined whether the particular directory 70 from the foreign SCM system 50 also exists in the central SCM system 40. If the directory also does not exist in the central SCM system 50 (i.e., D6 is "no"), then S7 and S8 generate a command to add the directory 70 in the central SCM system 40 and the command is written into the batch file 35, respectively. Once the 'add directory' command is written into the batch file 35 (i.e., S8 is completed), or the directory 70 already exists in the central SCM system 40 (i.e., D6 is "yes"), then D9 determines whether the particular file 60 already exists in the central SCM system 40. If not, S10 and S11 generate a command to add the file 60 in the central SCM system 40 and the command is written into the batch file 35, respectively. Once the 'add file' command is written into the batch file 35 (i.e., S11 is completed), or that the file 60 already exists in the central SCM system 40 (i.e., D9 is "yes"), then D12 queries whether the file 60 in the central SCM system 40 needs to be updated and/or modified.

If the file 60 needs to be updated and/or modified (i.e., D12 is "yes"), then, as connector labeled "1" indicates, the method proceeds to S13 shown in FIG. 3B. Contrastingly, if the file 60 does not need updating and/or modification (i.e., D12 is "no"), then, as the connector labeled "2" indicates, the method proceeds to D15 shown in FIG. 3B. At S13 and S14 the method generates a command to merge files 60 in the central SCM system 40 and the command is written into the batch file 35, respectively. Ultimately, at D15 the method queries it has reached the end of the list of files 60 and directories 70 (i.e., if there are additional files 60 and/or directories 70 remaining). If it is the end of the list (i.e., D15 is "yes"), then at P16 the SCM batch file 35 is completed. At S17 the completed batch file 35 may be run thereby synchronizing code from the various foreign SCM systems 50 into the central SCM system 40.

In this manner, the synchronization agent 30 is iteratively verifying (e.g., reading) from the list of files 60 and directories 70 from the foreign SCM system 50 source code whether each file is one of: a new directory 70, an existing directory 70, a new file 60, or an existing file 60. For each new file 60 and new directory 70 found from the list form the foreign SCM system(s) 50, the synchronization agent 30 creates a command in the batch file 35 that will add the applicable new directory 70 and/or new file 60. Similarly, if a file name discovered in a foreign SCM 50 is identical to the file name in the central SCM system 40, and yet the respective files 60 are different, the synchronization agent 30 may create a command in the batch file 35 that merges the file(s) 60 from the foreign SCM 50 with the file(s) from the central SCM 40 into a single file 60.

The completed batch file 35 (e.g., having received all necessary commands) may be run either automatically (e.g., upon completion, upon a particular schedule, etc.) and/or manually (e.g., upon a command, etc.).

Further, it should be apparent to one skilled in the art that the quantity of foreign SCM systems 50 addressed under aspects of the present invention, although shown as four (4) foreign SCM 50 in FIG. 2, may range from one to a near infinite quantity.

The present invention can be implemented on any now known or later developed computer system that is capable of executing computer program code. The computer program code can be provided on a computer-readable medium or provided in any other suitable manner.

The foregoing description of the embodiments of this invention has been presented for purposes of illustration and description. It is not intended to be exhaustive or to limit the invention to the precise form disclosed, and many modifications and variations are possible.

What is claimed is:

1. A method for synchronizing code from a plurality of Software Configuration Management (SCM) systems, comprising:
    creating an empty batch file;
    for each of a plurality of foreign SCM systems, wherein the plurality of foreign SCM systems includes SCM systems of at least one of: different types or different versions:
        obtaining source code from a foreign SCM system and source code corresponding to the foreign SCM system from a central SCM system, wherein the central SCM system includes a previously verified version of the source code corresponding to each of the plurality of foreign SCM systems;
        obtaining a list of files and directories based on the source code obtained from the foreign SCM system and a list of files and directories based on the source code obtained from the central SCM system;
        iteratively verifying from the list of files and directories based on the source code obtained from the foreign SCM system whether each file is one of: a new directory, an existing directory, a new file, or an existing file with respect to the list of files and directories based on the source code obtained from the central SCM system; and
        for each new file and each new directory verified from the foreign SCM system, creating in the batch file a command to add the new directory or the new file to the source code corresponding to the foreign SCM system in the central SCM system; and
    completing the batch file, wherein the completed batch file includes all commands required for a synchronization agent to synchronize the source code corresponding to each of the plurality of foreign SCM systems included at the central SCM system with the source code at each of the plurality of foreign SCM systems.

2. The method of claim 1, further comprising automatically or manually running the completed SCM batch file.

3. The method of claim 1, wherein if a file name in the foreign SCM is identical to a file name in the central SCM system and the file in the foreign SCM system and the file in the central SCM system are different, further comprising:
    creating a command in the batch file to merge the file from the foreign SCM and the file from the central SCM into a single file.

4. The method of claim 1, wherein the obtaining is done dynamically or statically.

5. The method of claim 1, wherein the iteratively verifying comprises reading a file.

* * * * *